United States Patent
Logan et al.

(10) Patent No.: US 7,689,801 B2
(45) Date of Patent: Mar. 30, 2010

(54) METHOD FOR DISTRIBUTING HYPERVISOR MEMORY REQUIREMENTS ACROSS LOGICAL PARTITIONS

(75) Inventors: Bryan M. Logan, Rochester, MN (US); Andres Gonzalez, Jr., Rochester, MN (US); Mark G. Manges, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 11/846,582

(22) Filed: Aug. 29, 2007

(65) Prior Publication Data

US 2009/0063806 A1    Mar. 5, 2009

(51) Int. Cl.
G06F 12/00 (2006.01)
(52) U.S. Cl. .................................................. 711/173
(58) Field of Classification Search ................. 711/153, 711/173
See application file for complete search history.

(56) References Cited

U.S. PATENT DOCUMENTS

| | | | | |
|---|---|---|---|---|
| 2005/0262505 A1* | 11/2005 | Esfahany et al. | ............... | 718/1 |
| 2008/0209153 A1* | 8/2008 | Schneider | ................... | 711/170 |
| 2008/0235457 A1* | 9/2008 | Hasenplaugh et al. | ....... | 711/130 |

* cited by examiner

Primary Examiner—Hiep T Nguyen
(74) Attorney, Agent, or Firm—Cantor Colburn LLP

(57) ABSTRACT

A method of reallocating memory to a hypervisor in a virtualized computing system, includes: assigning priorities to a plurality of logical partitions configured within the virtualized computing system; determining a memory requirement for the hypervisor, the hypervisor configured to manage the plurality of logical partitions; determining minimum levels of memory required for each of the plurality of logical partitions; determining the amount of available memory in the virtualized computing system; and in the event that the amount of available memory is less than the determined memory requirement of the hypervisor, removing portions of memory from one or more of the plurality of logical partitions based on the assigned priorities until the determined memory requirement for the hypervisor is obtained.

15 Claims, 2 Drawing Sheets

METHOD FOR DISTRIBUTING HYPERVISOR MEMORY REQUIREMENTS ACROSS LOGICAL PARTITIONS

TRADEMARKS

IBM ® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates generally to memory management, and more particularly to a method and system for preferentially reallocating memory to a hypervisor from a plurality of partitions in virtualized environments.

2. Description of the Related Art

Data communication continues to increase, especially with regard to the Internet where not only voice data but also high bandwidth video is being transmitted. The increasing data rates and volumes of information transmitted in communication systems and computer networks are driving demand for faster and more compact computer servers. Data centers, driven by the force of server consolidation, employ virtualization technologies to increase manageability and resource sharing.

In a virtualized environment, a layer of software called the hypervisor runs between the bare hardware and the operating system (OS), and provides the illusion of multiple "virtual" machines (VM), also called partitions or domains. A virtual machine is a virtual data-processing system that appears to be at the exclusive disposal of a particular user, but whose functions are accomplished by sharing the resources of a physical data-processing system. The VM provides a functional simulation of a computer and its associated devices and is based on an abstract specification for a computing device that can be implemented in different ways in software and hardware.

In the rack mount environment of a data center, hypervisors are employed to increase manageability and resource sharing (server consolidation). A data center typically needs to satisfy the requirements from multiple applications and/or multiple worldoads each spanning multiple VM instances.

FIG. 1 is a schematic of an existing virtualized computing system 100, including hardware 102, which is a collection of resources including CPU, memory and input/output (I/O) devices that are being virtualized; a hypervisor 104 that virtualizes the hardware resources and provides the upper layer with the illusion of multiple independent "virtual" machines; kernels 106 that run on top each "virtual" machine, and applications 108 in partitions 110 that in turn run on top of the kernels 106 and which are completely oblivious of the virtualization. The kernel is the part of an operating system that performs basic functions such as allocating hardware resources.

SUMMARY OF THE INVENTION

Embodiments of the present invention include a method and system for reallocating memory to a hypervisor in a virtualized computing system, the method includes: assigning priorities to a plurality of logical partitions configured within the virtualized computing system; determining a memory requirement for the hypervisor, the hypervisor configured to manage the plurality of logical partitions; determining minimum levels of memory required for each of the plurality of logical partitions; determining the amount of available memory in the virtualized computing system; and in the event that the amount of available memory is less than the determined memory requirement of the hypervisor, removing portions of memory from one or more of the plurality of logical partitions based on the assigned priorities until the determined memory requirement for the hypervisor is obtained.

A system for reallocating memory to a hypervisor in a virtualized computing system, the system includes: a hypervisor with a configuration manager, memory, and a plurality of logical partitions; wherein the configuration manager assigns priorities to the plurality of logical partitions, determines a memory requirement for the hypervisor, determines minimum levels of memory required for each of the plurality of logical partitions, and determines the amount of available memory in the virtualized computing system not committed to the plurality of logical partitions; and in the event that the amount of available memory is less than the determined memory requirement of the hypervisor, the configuration manager removes portions of memory from one or more of the plurality of logical partitions based on the assigned priorities until the determined memory requirement for the hypervisor is obtained.

Additional features and advantages are realized through the techniques of the present invention. Other embodiments and aspects of the invention are described in detail herein and are considered a part of the claimed invention. For a better understanding of the invention with advantages and features, refer to the description and to the drawings.

Technical Effects

As a result of the summarized invention, a solution is technically achieved for preferentially reallocating memory to the hypervisor from a plurality of partitions in virtualized environments. The present invention assigns priorities to each of the plurality of partitions, and obtains memory from each of the partitions to give to the hypervisor based on the assigned priority.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
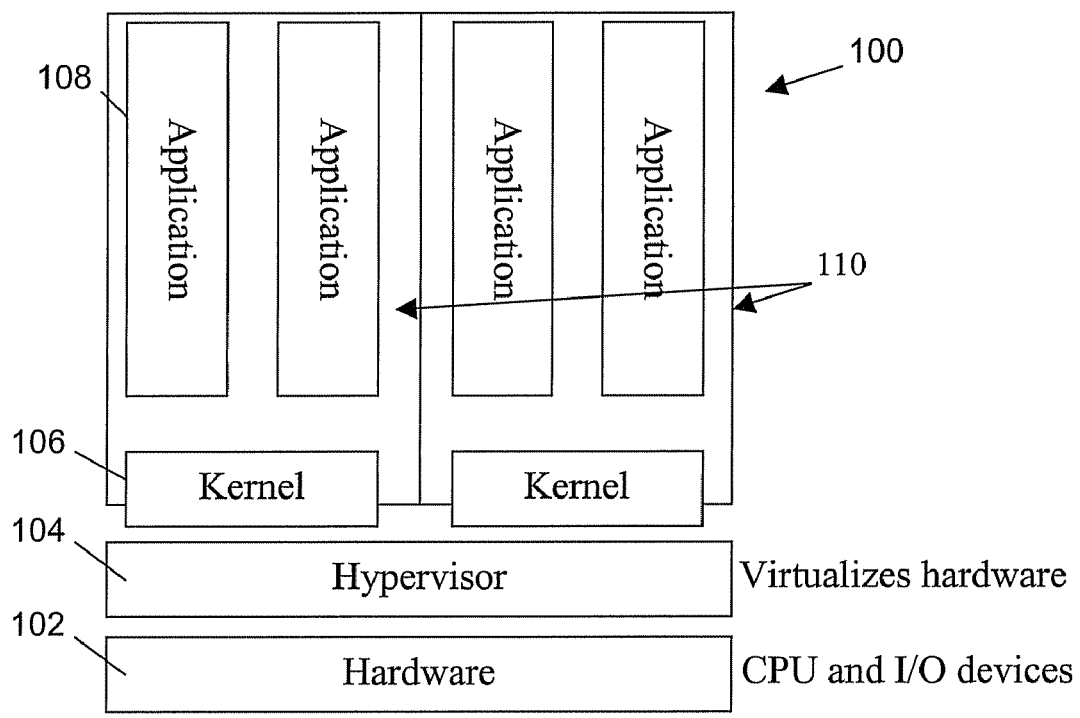
FIG. 1 is a schematic diagram of an existing virtualized computing system.

The detailed description explains the preferred embodiments of the invention, together with advantages and features, by way of example with reference to the drawings.

DETAILED DESCRIPTION

Embodiments of the invention provide a means for preferentially reallocating memory to a hypervisor from a plurality of partitions in virtualized environments. Embodiments of the present invention assign priorities to each of the plurality of partitions, and obtain memory from each of the partitions to give to the hypervisor based on the assigned priority.

In a logically partitioned environment, the hypervisor manages the partitions. However, the hypervisor itself needs to have memory reserved for its tasks, and this memory is not available for partition usage. When a new version of the hypervisor is released with new features and fixes, the hypervisor may be required to grow in size. If all of the memory in the system has been accounted for, the hypervisor will have to take memory from the partitions, thereby leaving the partition in a non-bootable or less than desirable state. In addition, if memory is lost due to the memory being dynamically disabled or it was only licensed on a trial basis, memory will need to be removed from the partitions.

Therefore, embodiments of the invention are configured for a user to specify a preference for which partitions should lose memory in situations when the hypervisor requires more memory, for example, when the hypervisor grows in a service pack or new release. With embodiments of the invention, the user may specify that taking memory from a test partition is more preferable than taking memory away from a production partition.

Embodiments of the invention are configured for a user to specify priorities for logical partitions. Based on the user specified priority, the hypervisor will then obtain memory from the lower priority partitions in order, trying to leave enough memory to satisfy the partition's minimum memory requirements.

Embodiments of the invention are configured for a user to specify coefficients to the partitions to indicate to the hypervisor the relative amount of memory to take from each partition in order to satisfy the hypervisor's memory requirements.

Embodiments of the invention are configured for a user to specify multiple "tiers" so that partitions in the lowest tier may have all of their memory removed before partitions in the higher tiers are touched.

Embodiments of the invention may be configured to determine the amount of hypervisor memory that is required that is unique to a partition, and penalize the partitions in line with their relative use of hypervisor memory. For example, HPT (hardware page tables) are allocated in the hypervisor for each partition. The size of the HPT will vary depending on the partition's maximum memory size. Therefore, if a system has two partitions, and logical partition 1 (LPAR 1) is using X MB (megabytes) of memory for HPT space and LPAR2 is using 2× MB of memory for HPT space, then LPAR2 should provide ⅔ of the memory needed to make up for the change in hypervisor requirements. Other configuration values that may affect hypervisor memory usage that can be tied directly to a partition (as opposed to hypervisor usage that is shared across the system) are virtual I/O, virtual service processors, and memory region for shared adapters.

When a logical partition is created, embodiments of the invention provide the user with the option of selecting a priority (or choosing to remain with the default priority) for additional memory usage by the hypervisor. The user-selected priority will then be used to determine the order that partitions will be penalized with a memory loss to satisfy the hypervisors expanded memory requirement. Alternatively, each partition may be assigned a "tier", which is another level of separation. The difference here is that partition assigned memory on the lower tiers must be penalized all the way to 0 before any partition assigned memory at a higher tier is utilized for the hypervisor.

Table 1 provides an example of tiered partition assigned memory. In the example of Table 1, there are two partitions with a minimum/current/maximum (min/cur/max) of memory A—100/150/200 MB and memory B—100/150/200 MB in the same tier. If the hypervisor requires an additional 75 MB, it may penalize the partitions by setting them to 100/100/200 and 100/125/200. Neither partition is penalized to the point where they drop below their min, so they remain bootable. However, if the partitions are in different tiers, as is the case in Table 2, memory A (tier 1) is penalized to 0/0/0 and memory B (tier 2) remains at 100/150/200 with no memory contribution to the hypervisor. In table 2, memory A makes the entire 75 MB contribution to the hypervisor, and is therefore penalized below its minimum of 100 MB required for a bootable state. Therefore memory A moves to 0/0/0 and is in a non-bootable state.

TABLE 1

| Tier 1 | min/cur/max | memory lost | min/cur/max | bootable |
|---|---|---|---|---|
| Memory A | 100/150/200 | 50 | 100/100/200 | yes |
| Memory B | 100/150/200 | 25 | 100/125/200 | yes |

TABLE 2

| | min/cur/max | memory lost | min/cur/max | bootable |
|---|---|---|---|---|
| Tier 1 | | | | |
| Memory A | 100/150/200 | 150 | 0/0/0 since current 75 MB below minimum | no |
| Tier 2 | | | | |
| Memory B | 100/150/200 | 0 | 100/150/200 | yes |

Figure 2:
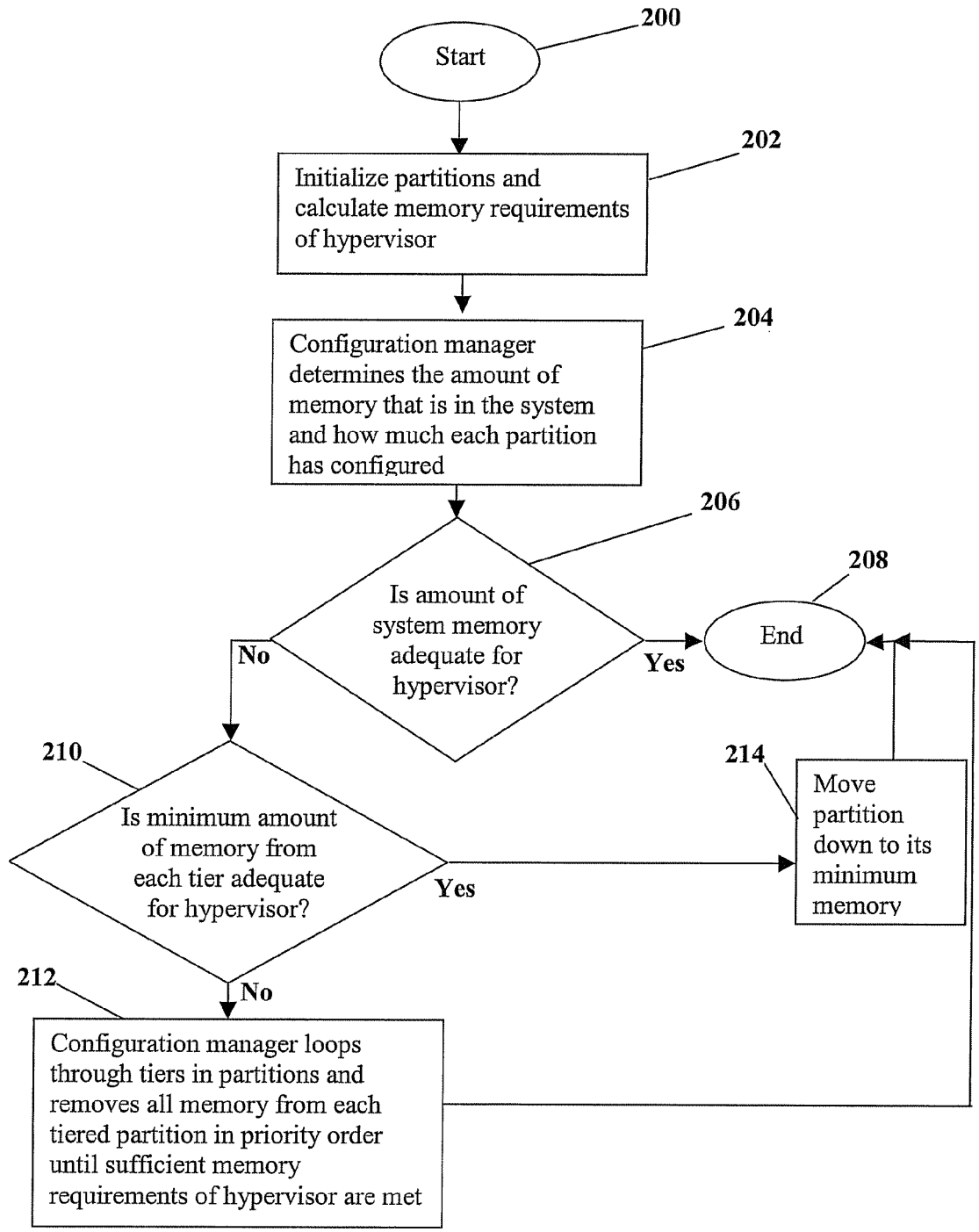
FIG. 2 is a flow diagram for reallocating memory to a hypervisor according to an embodiment of the invention.

FIG. 2 is a flow chart that illustrates the tiered allocation of memory to the hypervisor according embodiments of the invention. The process starts (block 200) when the partitions initialize and read their configurations (whether from non volatile random access memory (NVRAM), flash memory, or direct access storage device (DASD), the configuration manager will calculate how much memory the hypervisor needs (block 202). The configuration manager will then determine the amount of memory that is in the system and how much each partition has configured (block 204). If the amount of system memory is less than the hypervisor memory combined with the total of the partitions memory configuration (decision block 206 is No), the configuration manager will determine how to remove memory from the partitions. The allocation of memory is performed by looping through the tiers, starting with the lowest tier. In each tier, the partitions are gone through in partition order. The configuration manager will first determine if enough memory can be freed by moving the partitions to their minimums (decision block 210). If removing the minimum memory from each tier of the partition is adequate (decision block 210 is Yes), the configuration manager removes the minimum memory from each tier until the hypervisor requirements are met (block 214). If not (decision block 214 is No), the configuration manager will remove all the memory from a partition and mark it as non-bootable. If enough memory has not been freed when all partitions in a lower tiered have been move to non-bootable with 0 memory, the process will then move to the partitions in the next tier, attempting to remove their memory to their min, and then marking as non-bootable if needed (block 212). The process ends (block 208) when the hypervisor has sufficient assigned memory.

In an alternative embodiment of the invention, the system may determine the amount of memory that is allocated in the hypervisor that is specific to a particular partition. Allocations in the hypervisor that are used by all partitions (such as global error routing or the configuration manager itself) would be evenly divided among all partitions that utilize it. While some applications may be utilized by all partitions, some applications may only be used by a subset of partitions, such as a device manager handling the allocation of shared I/O devices. Only partitions using that shared I/O would incur the penalty of the device manager for that shared I/O. However, for allocations that are specific to a partition, such as Virtual I/O or a partition's HPT, would count against that partition. Each partition would then be given a coefficient of how much memory it is using in the hypervisor relative to other partitions. The configuration manager will then penalize the partitions accordingly, by looping through the partitions in priority order (lowest to highest), and penalizing the partitions by an amount proportional to their usage of hypervisor resources. The penalty may be rounded up to a configuration granularity in order to satisfy the hypervisor memory requirements. If a partition's penalty causes it to drop below its minimum memory requirement, then the partition will be moved to 0 memory and marked as non-bootable. In this case, even though a partition was only suppose to contribute 64 MB, it may actually contribute 128 MB, since the removal of the 64 MB would cause the partition to be non-bootable, it would contribute as much as it could in its non-bootable state.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for reallocating memory to a hypervisor in a virtualized computing system, the method comprising:
    assigning priorities to a plurality of logical partitions configured within the virtualized computing system;
    determining a memory requirement for the hypervisor, the hypervisor configured to manage the plurality of logical partitions;
    determining minimum levels of memory required for each of the plurality of logical partitions;
    determining the amount of available memory in the virtualized computing system; and
    in the event that the amount of available memory is less than the determined memory requirement of the hypervisor, removing portions of memory from one or more of the plurality of logical partitions based on the assigned priorities until the determined memory requirement for the hypervisor is obtained.

2. The method of claim 1, wherein memory is taken from each of the plurality of logical partitions until a minimum operating level of memory for a logical partition is reached.

3. The method of claim 1, wherein:
    the plurality of logical partitions are assigned tiers, comprising a minimum memory amount, a current memory amount, and a maximum memory amount; and
    the tiers are used to rank the plurality of logical partitions.

4. The method of claim 3, wherein one or more of the lowest ranked tiered partitions are depleted of memory below the minimum memory amount thereof whenever the total amount of memory obtained from the plurality of logical partitions is insufficient to meet the determined memory requirement of the hypervisor; and
    successive tiers from the plurality of logical partitions are additionally depleted of memory below the minimum amount thereof until the determined memory amount of hypervisor is met.

5. The method of claim 1, wherein coefficients are assigned to each of the plurality of logical partitions;
    wherein each of the assigned coefficients is proportional to the relative use of the hypervisor by each of the plurality of logical partitions.

6. A system for reallocating memory to a hypervisor in a virtualized computing system, the system comprising:
    a hypervisor with a configuration manager, memory, and a plurality of logical partitions;
    wherein the configuration manager assigns priorities to the plurality of logical partitions, determines a memory requirement for the hypervisor, determines minimum levels of memory required for each of the plurality of logical partitions, and determines the amount of available memory in the virtualized computing system not committed to the plurality of logical partitions; and
    in the event that the amount of available memory is less than the determined memory requirement of the hypervisor, the configuration manager removes portions of memory from one or more of the plurality of logical partitions based on the assigned priorities until the determined memory requirement for the hypervisor is obtained.

7. The system of claim 6, wherein memory is taken from each of the plurality of logical partitions until a minimum operating level of memory for a logical partition is reached.

8. The system of claim 6, wherein:
    the plurality of logical partitions are assigned tiers, comprising a minimum memory amount, a current memory amount, and a maximum memory amount; and
    the tiers are used to rank the plurality of logical partitions.

9. The system of claim 8, wherein a lowest ranked tiered partition is depleted of memory below the minimum memory amount thereof whenever the total amount of memory obtained from the plurality of logical partitions is insufficient to meet the determined memory requirement of the hypervisor; and
    successive tiers from the plurality of logical partitions are additionally depleted of memory below the minimum amount thereof until the determined memory amount of hypervisor is met.

10. The system of claim 6, wherein coefficients are assigned to each of the plurality of logical partitions;
    wherein each of the assigned coefficients is proportional to the relative use of the hypervisor by each of the plurality of logical partitions.

11. An article comprising one or more computer-readable storage media containing instructions that when executed enable a computer to implement a method of reallocating memory to a hypervisor in a virtualized computing system; wherein the method further comprises:
- assigning priorities to a plurality of logical partitions configured within the virtualized computing system;
- determining a memory requirement for the hypervisor, the hypervisor configured to manage the plurality of logical partitions;
- determining minimum levels of memory required for each of the plurality of logical partitions;
- determining the amount of available memory in the virtualized computing system; and
- in the event that the amount of available memory is less than the determined memory requirement of the hypervisor, removing portions of memory from one or more of the plurality of logical partitions based on the assigned priorities until the determined memory requirement for the hypervisor is obtained.

12. The article of claim 11, wherein memory is taken from each of the plurality of logical partitions until a minimum operating level of memory for a partition is reached.

13. The article of claim 11, wherein:
- the plurality of logical partitions are assigned tiers, comprising a minimum memory amount, a current memory amount, and a maximum memory amount; and
- the tiers are used to rank the plurality of logical partitions.

14. The article of claim 13, wherein a lowest ranked tiered partition is depleted of memory below the minimum memory amount thereof whenever the total amount of memory obtained from the plurality of logical partitions is insufficient to meet the determined memory requirement of the hypervisor; and
- successive tiers from the plurality of logical partitions are additionally depleted of memory below the minimum amount thereof until the determined memory amount of hypervisor is met.

15. The article of claim 11, wherein coefficients are assigned to each of the plurality of logical partitions;
- wherein each of the assigned coefficients is proportional to the relative use of the hypervisor by each of the plurality of logical partitions.

* * * * *